April 25, 1939. R. MARKHAM 2,155,433
AUTOMATIC DIRECTION SIGNALING DEVICE FOR VEHICLES
Filed Nov. 23, 1936 3 Sheets-Sheet 1
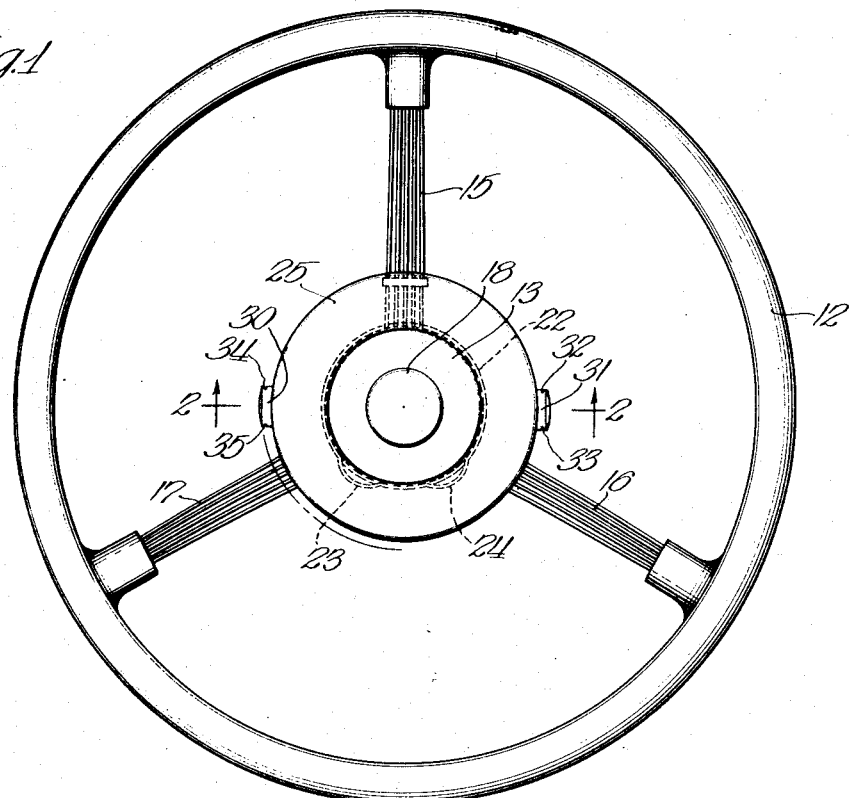
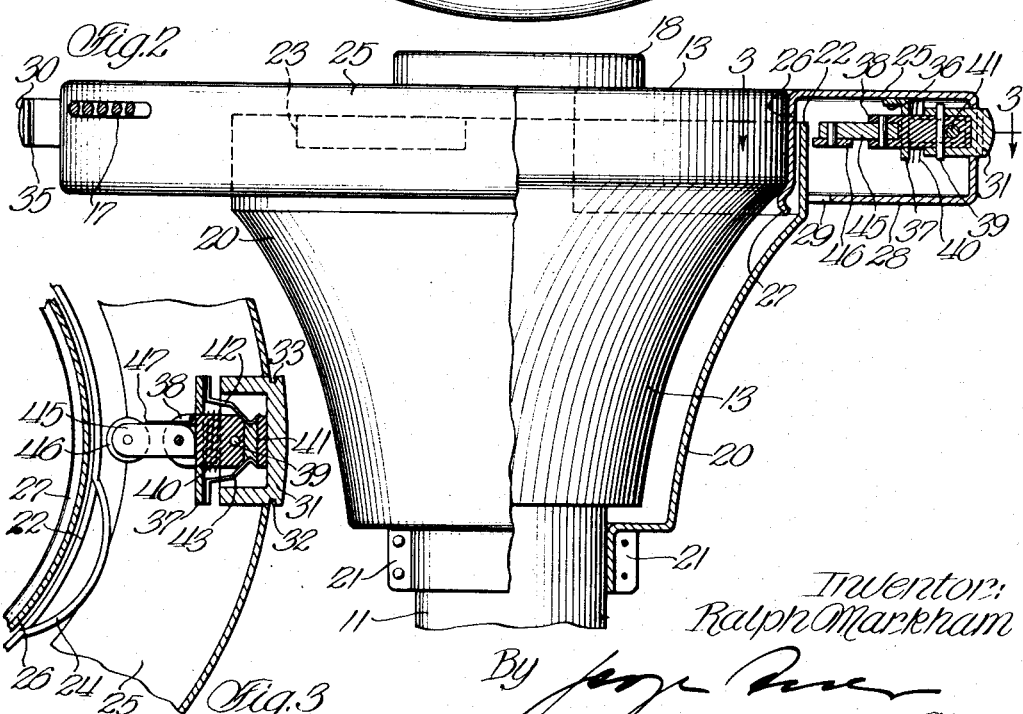
Inventor:
Ralph Markham
By
Atty.

April 25, 1939.  R. MARKHAM  2,155,433
AUTOMATIC DIRECTION SIGNALING DEVICE FOR VEHICLES
Filed Nov. 23, 1936  3 Sheets—Sheet 2

Inventor:
Ralph Markham
By [signature]
Atty

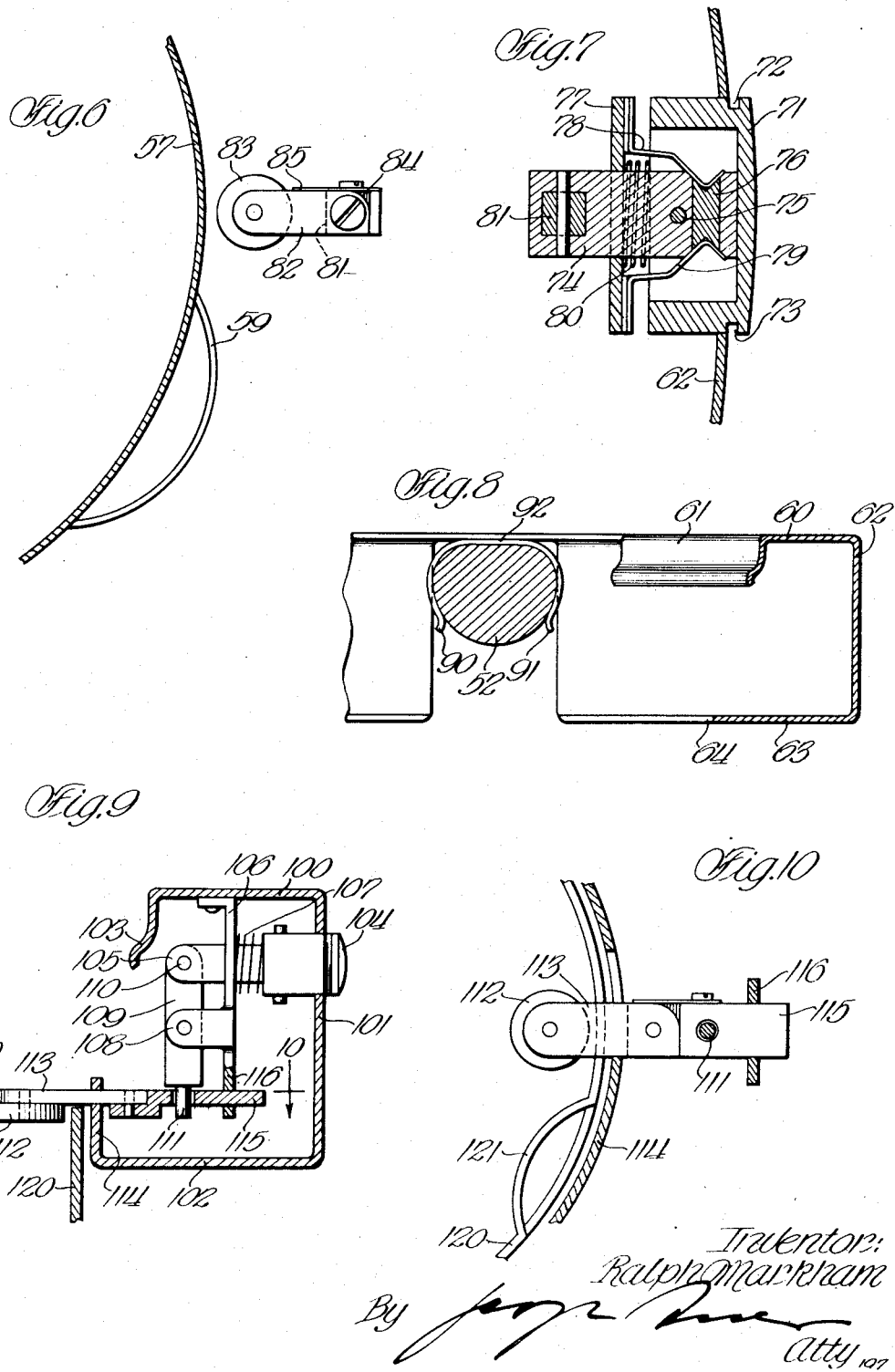

Patented Apr. 25, 1939

2,155,433

UNITED STATES PATENT OFFICE 2,155,433

AUTOMATIC DIRECTION SIGNALING DEVICE FOR VEHICLES

Ralph Markham, Chicago, Ill.

Application November 23, 1936, Serial No. 112,253

5 Claims. (Cl. 200—59)

My present invention relates to a device for automatic signaling, particularly in connection with automotive vehicles, and is designed to indicate the intention of making a turn prior to and during actually executing the required change in the direction of travel. The invention may be considered an improvement on the device disclosed in my co-pending application, Ser. No. 106,807.

The structure disclosed in this prior application comprises, briefly stated, a cup-shaped lower housing portion firmly attached to the stationary steering column, with its open end just below the spokes of the steering wheel, and equipped with a cam disposed at its bottom. An annularly-shaped upper housing portion is secured to the steering wheel and is rotatable therewith and therefore rotatable relative to the stationary housing. The side wall of the rotatable housing depends from the steering wheel and overhangs the wall of the open end of the stationary housing member. Contact means constructed in the form of vertically operable push button switches are provided on and within the rotatable housing portion, one for each major change in travel direction, and each may be selectively actuated when the driver wishes to execute the corresponding change in the direction of travel. Each of these switch and contact mechanisms, when depressed, is positioned for cooperation with the cam within the stationary housing portion in such a manner that the change in the direction of travel can be properly carried out, whereupon the corresponding actuating contact mechanism and associated push button is automatically released and restored to normal incident to turning the steering wheel back to position for forward travel. The actuation of either one of these push buttons and contact mechanisms closes certain circuits for the operation of signaling means which indicate and signal the desired turn in a suitable manner and are restored to normal at the time when the corresponding switch and push button returns to normal position.

The instant invention covers improvements over this prior structure, which enhance its utility and extend its usefulness, as is briefly pointed out below.

In the embodiment previously disclosed I have shown a single cam member associated with the stationary housing portion; in the present structure I prefer to provide a plurality of cam members for cooperation with the contact mechanisms. A more positive contact actuation is thereby secured, particularly in marginal cases, for example, when driving through a curve of great radius, and the release of the entire mechanism to normal is facilitated.

The previous embodiment shows the contact means disposed so that it is operable vertically, i. e., with the axis parallel to the steering column; in the present disclosure I describe a structure wherein the axis of each of the contact switches is disposed at an angle to the axis of the steering mechanism. This feature enhances the invention because it provides for specific embodiments in conjunction with steering wheel structures wherein vertically disposed contacts and push buttons may be undesirable or unsightly, and it also extends the applicability and utility of the invention, since it provides alternative embodiments to suit a variety of different steering wheel types as well as established operating habits. It also simplifies the manipulation of the device.

Another improvement is provided in the switch or contact structures per se. I embed a conductive member in the form of a transverse contact pin member within the insulating material of the operating shaft of the switch structure shown herein, constituting a movable contact member, whereby the production and operation of the switch are rendered simpler and more reliable.

A further feature is realized in the provision of means whereby the movable housing or casing portion is more effectively secured in place on the rotatable steering wheel.

Still another feature incorporated in the instant case relates to simple means whereby a contact switch (push button) may be manually released if inadvertently or erroneously depressed.

The above noted and other new objects and features will presently appear from the detailed explanations rendered below with reference to the drawings, wherein Fig. 1 shows a plan view of a type of steering wheel now frequently used, having an operating handle or rim resiliently attached to its hub casing and provided with the push button signaling contact switches of my invention;

Fig. 2 is a side view, partly in section, taken along the line 2—2 of Fig. 1;

Fig. 3 is a sectional view through the contact switch mechanism taken along the line 3—3 of Fig. 2;

Figure 4:
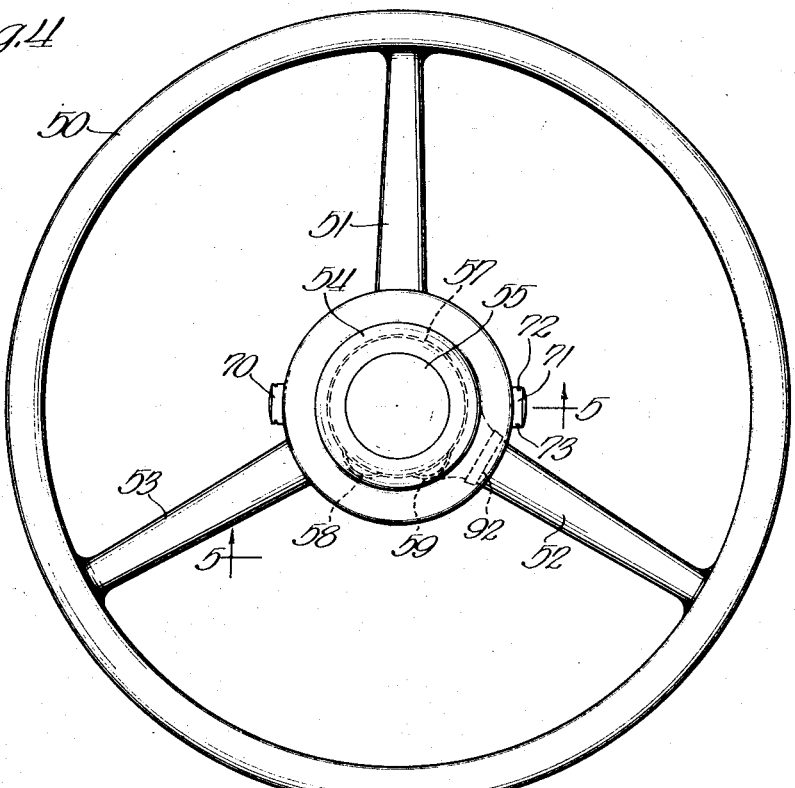
Figs. 4 and 5 are views of a different embodiment for use with another type of steering wheel, corresponding in layout to the views shown in Figs. 1 and 2.
Figure 5:
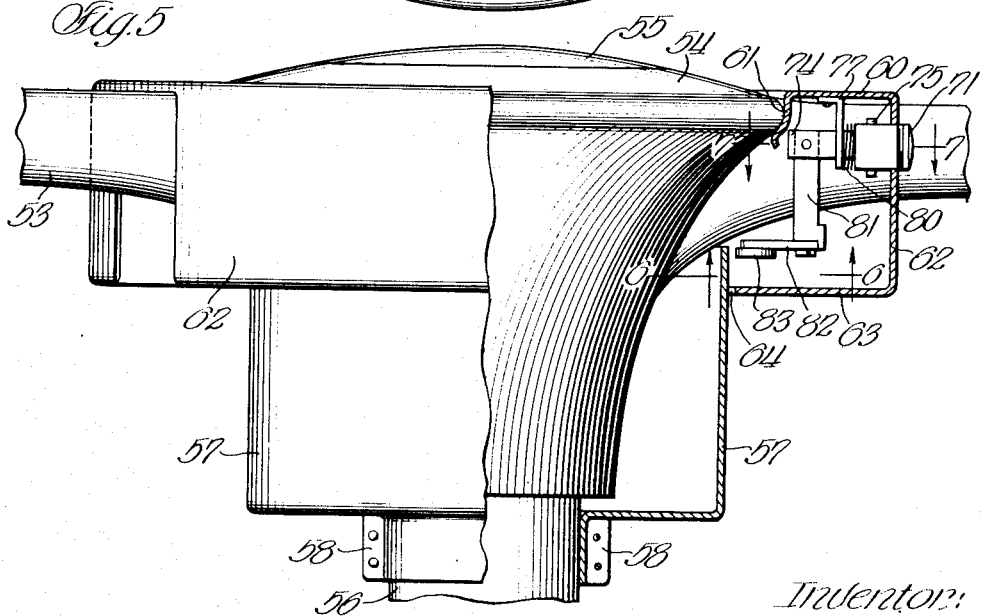

Figs. 6 and 7 are two sectional views taken along lines 6—6 and 7—7, respectively, in Fig. 5, illustrating details of the switch mechanism and the cooperation thereof with the cam;

Fig. 8 is a sectional view through a spoke of a steering wheel, for example, the steering wheel shown in Figs. 4 and 5, and illustrates improved means for attaching thereto part of the annular casing structure; and Figs. 9 and 10 are two views of an alternative contact and switch structure.

Referring now particularly to Figs. 1, 2 and 3, numeral 11 (Fig. 2) indicates the stationary steering column or post of a steering wheel having a handle portion or rim 12 secured to the centrally located hub portion 13 by means of the spokes 15, 16, 17 each of which may be composed of a number of metallic rods in accordance with the practice now gradually entering the trade in connection with certain types of cars. Numeral 18 indicates the horn button which is located centrally within the hub 13 of the steering wheel. This hub portion 13 extends down along the steering column tapering toward it, as is particularly indicated in Fig. 2. The mechanism so far described may be called standard, the function of the individual parts noted being well known.

My device, as used in the embodiments shown in Figs. 1 to 3, inclusive, comprises the lower housing or casing portion 20 secured to the stationary steering column 11, as indicated at 21. This housing may consist of two parts each provided with a suitable flange or ear, as indicated at 21, which may be bolted or riveted together in any desired manner. The housing 20 may also be of an integral tubular cup- or shell-like structure for attachment on the steering column 11 from above after removal of the central hub portion 13. Either structure may be employed according to requirements that may arise in any individual case.

The wall of this stationary housing 20 rises from the place of attachment to the steering column 11 in a flaring manner, as indicated, conforming preferably to the general shape of the hub portion 13. Near the upper end the wall of the stationary housing 20 is carried, as shown in Fig. 2, in parallel with the axis of the steering column 11. This end of the stationary housing is designated by the numeral 22 and carries two cam-like projections 23—24 (Fig. 1), each of which may be stamped out of the material of the wall 22, as indicated in Fig. 3 in connection with the cam projection 24. It may be noted at this point that I have disclosed in the previously mentioned co-pending application a resilient cam member. The cams 23 and 24 may, of course, be made resilient if desired or required, in accordance with the description rendered in the co-pending application.

Another cooperating housing or casing portion 25 is of annular shape having depending inner walls 26 extending in the form of segments between the spaces of the spokes 15, 16 and 17, and terminating in curved lower ends 27 which act in the manner of clips for the purpose of fastening this annular housing portion firmly on the hub 13, as shown in Fig. 2. The outer wall of this annular housing portion is carried down and inwardly, as indicated at 28, leaving a space 29 through which projects the upright wall 22 of the lower stationary housing 20. In other words, the open end of the lower stationary cup-shaped housing carrying the cams 23 and 24 enters in this embodiment into the annular rotatable housing 25. The cam-carrying end 22 is disposed in a plane above the bottom plane of the annular casing. Inasmuch as the casing 25 is secured to the rotatable steering wheel, it is rotatable therewith and therefore rotatable relative to the cam-carrying stationary lower casing 20.

The rotatable annular housing portion 25 is equipped at two opposite points with self-locking push button operated switches 30—31, respectively, each switch being provided for actuation when the driver wishes to signal or indicate the intention of executing a major change in the direction of travel. The switch 30 will be depressed when the driver desires to make a left turn, and the switch 31 when a right turn is to be made. The actuation of either of these switches closes certain circuits, as particularly described in my co-pending application, and in response thereto signaling apparatus are actuated; for example, distinctive signal lights are suitably connected to electric current in order to indicate to the oncoming and following traffic, or to only one predetermined traffic, the intention of the driver to make the signaled turn. In connection with these push buttons and switch mechanisms I have provided a simple auxiliary manual release feature consisting in the provision of grooves or notches, such as indicated at 32—33, 34—35, in conjunction with the push buttons 30 and 31, respectively, whereby the driver can release either push button if it should have been inadvertently depressed or if the driver changes his mind prior to executing the signaled change in the direction of travel. The corresponding depressed push button may be withdrawn simply by gripping it by means of the grooves 32—33 or 34—35, as the case may be, and pulling it out into normal or released position.

The structure of one switch mechanism is shown in detail in Fig. 2 and will be described next.

Within the upper annular rotatable housing portion 25 are brackets, such as indicated at 36, one such bracket holding the switch mechanism, for example, the one provided for cooperation with the insulating push button 31. The depending portion 37 of the bracket 36 is provided with an opening for receiving in sliding relation thereto the operating shaft 38 of the switch mechanism. This shaft is made of insulating material and is firmly fastened to the shell of the push button 31 by means of a pin such as indicated at 39. It is thus movable with the push button 31. A spring, such as 40, is inserted between the inner edge of the push button 31 and the depending portion 37 of the bracket 36 so as to bias the push button and the switch shaft in the normal or released position with the push button completely protruding from the upper casing 25, as shown in Fig. 1. In Figs. 2 and 3 I have shown the switch mechanism 31, 38 in actuated position and push button 30 in released position. Near its end I have provided in the shaft 38 a metallic pin, as indicated at 41, constituting the contact member proper which cooperates with the contact springs 42 and 43, respectively, mounted in insulated relation to and upon the bracket 36—37, as shown in Fig. 3. The material of the contact shaft 38 and of the contact pin 41 is recessed or grooved on opposite sides for engagement with the corresponding spring portions of contact springs 42 and 43, as shown. When the mechanism is in operated position, the springs 42—43 (Fig. 3) engage the recessed portion of the contact shaft and contact member and hold the switch in self-locking actuated position. Electrically conductive relation is then established between the contact spring 42 and the contact spring 43 which may be connected by any suitable means with the corresponding circuit. The contact wires required for this purpose may be conducted through suitable openings in the steering mechanism, and particularly the hub 13, in a manner well understood in the art. A complete operating circuit showing a wiring diagram and describing the method of signaling in detail is contained in my previously noted application.

Secured at the other end of the switch shaft 38 is a trip or release arm 45 carrying a roller 46. This arm is attached to the switch shaft 38 by means of a journal pin, as shown. One edge of the arm 45 is rounded, as indicated in Fig. 3, and a suitable leaf spring, such as 47, may be provided so as to hold this arm 45 in normal position. Of course, any other biasing means may be provided in lieu of the spring 47 which is shown as a simple leaf spring merely for the purpose of convenient description. It will be clear that the release arm 45 with its roller 46 is capable of tilting from its position shown in Fig. 3 only in one direction.

Assuming now that the push button 31 was depressed by the driver prior to making a right turn, the switch mechanism will be in the position shown in Fig. 3 with the contact springs 42 and 43 engaging the contact pin 41. The signaling circuit is closed for the operation of signaling apparatus and equipment, for example, proper signal lamps or mechanical signal means attached to the rear end of the vehicle, signaling the intention of the driver to execute the turn. In case the driver should change his mind, he will pull out the push button 31 and restore the mechanism to normal position, as previously noted. However, assuming that the turn is to be executed, the steering wheel is rotated in the usual manner in clockwise direction, and the annular housing 25, and with it both of the switch mechanisms, are carried along and rotate relative to the stationary housing 20 and relative to the stationary cams 23 and 24 projecting into the annular housing portion 25. Push button 31 is now depressed, and the switch shaft 38 and release arm 45 are in the position shown in Fig. 3; that is, the roller 46 is now in the path of the cams 23 and 24 when the steering wheel, and with it the switch mechanisms are rotated. The rotation of the steering wheel being in clockwise direction, that is, as seen in Fig. 3 from the top to the bottom, when the roller 46 encounters the first cam 24, the arm 45 will tilt and pass over the cam without altering the switch condition at all. It will then straighten out again and pass over the second cam 23 if a sharp turn is to be negotiated and will again straighten out. The signals thus remain actuated prior to and during the time of executing the turn or change in the direction of travel. However, when the steering wheel is rotated into the return position for forward travel, the switch mechanism is moved in contrary direction relative to the stationary cams 23 and 24, and when the roller 46 now encounters the first cam, the release arm 45 will not tilt but the rise of the cam will push the arm and with it the entire switch mechanism into its normal or released position, removing the contact springs 42—43 from engagement with the contact 41 and thereby breaking the actuating signaling circuit and releasing the corresponding signals to normal. The device is again at rest and may be re-operated prior to initiating another turn in either one of the major directions of travel.

The structure shown in Figs. 4, 5, 6 and 7 is functionally similar to the one just described above. However, this particular embodiment is peculiarly adapted for operation in conjunction with a different type of steering wheel, namely, a steering wheel having solid spokes, such as the one shown in Figs. 4 and 5. The steering wheel comprises the usual operating rim or handle portion 50 which is connected by means of three spokes 51—52—53 with the centrally located hub portion 54. Numeral 55 indicates the horn button. The hub 54 tapers down toward the stationary steering column 56 to which is attached the lower stationary cup-shaped housing 57. This housing may again be composed of two portions attached by means of clamps or flanged clip members 58 in firm connection with the steering column 56. At the upper end of the cup-shaped housing 57 may be provided the cams 58 and 59 (Fig. 4) corresponding to the cams 23 and 24 shown in the previous embodiment. The upper annular rotatable housing portion 60 is attached to the hub 54 of the steering wheel by means of depending clip-like extensions 61 similar to the embodiment previously described. The outer depending wall 62 of the rotatable housing 60 is turned in at the bottom, as indicated at 63, leaving a space 64 through which the upright wall 57 of the lower stationary housing enters into the upper rotatable housing. The cam-carrying end of the stationary casing member is thus again disposed within the rotatable housing or above the plane defined by the bottom wall 63 of the latter.

Two laterally-extending push button switches, such as 70 and 71, are again provided in the annular rotatable housing 60, the push buttons projecting from the vertical side wall thereof. From Fig. 7 it will be seen that the right-hand mechanism for signaling a right turn comprises again the push button shell 71 with its release grooves or slots 72—73 carrying the switch shaft 74 secured to it by means of pin 75. The shaft 74 and the push button shell 71 are, of course, again made of suitable insulating material. The shaft 74 is also provided with a contact pin, such as 76, and is slidably secured within an opening of a bracket 77 attached to the inside of the annular housing portion 60. This bracket also carries the contact springs 78 and 79 adapted to engage the recesses or grooves provided on opposite sides of the shaft 74 so as to make engagement with the conductive contact pin 76 and to close the circuit. A spring 80 is disposed between the bracket 77 and the lower edge of the push button shell, as shown, in order to bias the shaft 74 and therewith the push button 71 into normal released position. Secured to and depending from the shaft 74, or an integral part thereof, is another shaft 81 carrying at its lower end the release arm 82 provided with a roller 83. This arm 82 is again rounded at one end, as indicated in Fig. 6 at 84, so that it may tilt in one direction responsive to an obstruction encountered by the roller 83 in one travel direction. A suitable biasing spring, such as 85, may again be provided so as to hold the shaft 82 and the roller 83 in a predetermined position. It should be remembered that the leaf spring 85 is merely shown for the sake of convenience and that any suitable type of biasing means may take its place in a practical embodiment.

The operation of the above described embodiment, illustrated in Figs. 4 to 7, inclusive, is similar to the operation previously noted. The tilting release member, that is, the arm 82 with its roller 83, is not directly secured to the shaft 74 of the switch mechanism because the structure of the steering wheel makes it necessary to dispose the cams 58 and 59 and switch shaft 74 in different planes, or, in other words, on a line which is lower than the axis of the switch shaft 74. The described structure preserves the desirable location of the push button 70 and 71 near the upper rim of the rotatable housing portion where they are easily accessible in response to a sliding motion of the hand of the operator substantially in the plane of the steering wheel.

In Fig. 8 is illustrated a section of the upper rotatable housing 60 with relation to one of the spokes, for example, the spokes 52 of the steering wheel shown in the last described embodiment. Numeral 61 indicates the clip-like inner depending wall of the housing 60 for attachment to the rim of the central hub portion 54 between the spokes 51 to 53, inclusive. Numerals 62 and 63 are the outer depending and the lower horizontal sections of the annular housing in accordance with previous explanations. The housing is thus attached to the steering wheel between the spokes. In order to provide a further means for securely attaching the housing without any need for bolts or screws or the like, clips, such as 92, may be provided in the annular housing having depending members 90—91 adapted to engage and to grip the corresponding spoke, as shown in Fig. 8. Similar clip members may, of course, be provided for attachment with the spokes 51 and 53. Similar means for securing the attachment of the mechanism may also be provided in the embodiment illustrated in Figs. 1 to 3, inclusive.

The switch mechanisms shown in Figs. 5, 6 and 7 are operated by the corresponding push buttons and released by the cams cooperating with the release arms, producing, e. g., a frictional force against the roller 83 and shaft 82 (Fig. 6) so as to move the switch shaft 74 in a direction identical to the direction of movement of the release arm 82 in response to non-yielding engagement with one of the cams. The arm 82 and shaft 74 are, however, disposed on different levels or planes and connected by the member 81 (Fig. 5). A lever action will thus result which may be detrimental to the mechanism in all such cases where the connecting member 81 is of unusual length.

In order to provide for a mechanism wherein this tilting lever action or force is taken care of, I have shown a switch and actuating structure in Figs. 9 and 10 provided within an annular rotatable housing 100 having a depending outside wall 101 and a turned-in lower wall 102, as well as the inner depending clip members 103, all in accordance with the previously described structure. The push button 104 extends into the housing, as shown, and is attached to the switch shaft 105 which is mounted in a journal bracket 106 in accordance with previous embodiments. A biasing spring 107 is again provided in order to assist in keeping the push button and the switch mechanism in normal position. The bracket 106 is extended downwardly and is provided with ears, such as 108, furnishing a journal bearing for the member 109 which is at one end pivotally connected to the switch shaft 105, as indicated at 110. The lower end 111 of the member 109 is thus capable of oscillating to the right and to the left responsive to the actuating motion and release motion of the push button 104. The switch restoring mechanism consists again of a roller 112 secured to the release arm 113 which is carried in a bearing extension 114 of the shell of the housing 100. The release arm 113 is secured to an auxiliary release arm 115, as shown in Figs. 9 and 10, and is tiltable in one direction, as previously described. One end of the auxiliary arm 115 is guided within an opening of an extension 116 of the bracket 106. This auxiliary release arm is also provided with an opening through which projects the end 111 of the member 109.

The release cam or cams in this case do not project to the outside of the upright wall of a stationary housing, indicated by the numeral 120 in Figs. 9 and 10, but project from the inside of this housing wall toward the center of the steering column. One such cam is indicated in Fig. 10 at 121. The roller 112 is also disposed within or projects beyond the wall of the housing 120, whereas in previous embodiments this roller was disposed outside of the corresponding wall. However, the cam-carrying end of the stationary casing portion is again disposed within the annular space defined by the top and bottom walls of the rotatable casing member or, in other words, above the plane defined by the bottom wall of the latter.

Assuming, now, that the push button 104 is depressed, as shown in Fig. 9, the switch shaft 105 moves to the left, and the lower end 111 of the lever 109 moves to the right, carrying along the auxiliary release arm 115 and the release arm 113 holding the roller 112. This operation therefore moves the roller 112 toward and within the path or range of the cams, such as the cam 121. When the steering wheel is now rotated in the direction in which the change of travel movement is desired, the roller 112 will again contact the cam 121, as previously described, and will tilt or yield in the corresponding direction without altering the operated contact condition of the switch mechanism. However, when the steering wheel is moved in contrary direction, the roller 112 moves with relation to the stationary cam or cams 121 in opposite direction and, inasmuch as it cannot tilt now, the rise of the cam causes a movement of the release arm 113 to the left (as shown in Fig. 9) carrying along the auxiliary release arm 115 and thereby moving the lower end 111 of the lever 109 to the left. Accordingly, the upper end of this lever 109 moves to the right and restores the switch shaft 105 and the push button 104 to normal.

Changes in detail parts or in the assemblies shown are possible and are within the scope of the invention. Therefore, it is understood that I do not want to be held strictly to the structures shown and described. What I believe to be new and desire to have protected by Letters Patent of the United States is specifically pointed out in the appended claims.

I claim:

1. An automobile turn signaling device for attachment to the steering wheel and steering column, comprising an integral annular upper casing attached to the rotatable steering wheel and having four walls defining an annularly-extending transversely angular space, a generally cup-shaped lower casing attached to the stationary steering column with the open upper end disposed in a plane lying above the bottom line of said annular space defined by said upper casing, said casings forming an exteriorly substantially closed housing the upper portion of which is rotatable with the steering wheel, horizontally-extending switching means carried only in said annular upper casing, a push button for said switching means protruding laterally from said upper casing for actuating said switching means, and cam means carried by said cup-shaped stationary lower casing substantially at the upper open end thereof and within the annular space defined by the top and bottom walls of said annular rotatable casing for automatically restoring said switching means depending on the direction of rotation of said steering wheel.

2. The structure defined in claim 1, wherein a pair of push buttons and associated switching means are carried by said upper annular casing, one for each major change in travel direction to be signaled, and wherein a pair of cam means are carried by said stationary cup-shaped casing for coacting with said switching means.

3. The structure defined in claim 1, wherein said cam means is disposed in a plane below the center line of said push button, together with link means disposed within said annular casing and extending from said push button to the plane of said cam means.

4. A switch device for an automobile turn signaling apparatus, comprising a rotatably mounted operating holder which consists of a shell defining an enclosed annularly-extending transversely angular space with an annular opening at the bottom thereof, a stationary release holder which consists of a generally cup-shaped shell having an annular wall projecting into the angular space of said operating holder through said annular bottom opening, switching means within said operating holder and manually operable actuating means therefor projecting to the outside thereof, and release means carried by said release holder for coaction with said switching means.

5. The structure defined in claim 4, wherein said switching means and said actuating means therefor are disposed laterally on a line perpendicular to the axis of said operating holder, and wherein cam means carried by the annular wall of said release holder constitute said release means.

RALPH MARKHAM.